United States Patent
Kravtsov et al.

(10) Patent No.: US 12,425,441 B2
(45) Date of Patent: Sep. 23, 2025

(54) SYSTEMS AND METHODS FOR PROTECTING POD DEPLOYMENT

(71) Applicant: Cisco Technology, Inc., San Jose, CA (US)

(72) Inventors: Alexei Kravtsov, Petah Tikva (IL); Idan Frimark, Tzora (IL); Erez Fishhimer, Tel-Aviv (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 149 days.

(21) Appl. No.: 18/349,348

(22) Filed: Jul. 10, 2023

(65) Prior Publication Data

US 2023/0353593 A1  Nov. 2, 2023

Related U.S. Application Data

(63) Continuation of application No. 17/335,848, filed on Jun. 1, 2021, now Pat. No. 11,700,274.

(60) Provisional application No. 63/145,579, filed on Feb. 4, 2021.

(51) Int. Cl.
*H04L 9/40* (2022.01)

(52) U.S. Cl.
CPC ...... *H04L 63/1433* (2013.01); *H04L 63/0263* (2013.01); *H04L 63/105* (2013.01); *H04L 63/1408* (2013.01); *H04L 63/205* (2013.01)

(58) Field of Classification Search
CPC ............. H04L 63/1433; H04L 63/0263; H04L 63/105; H04L 63/1408; H04L 63/205; H04L 63/20
See application file for complete search history.

(56) References Cited

U.S. PATENT DOCUMENTS

| | | | |
|---|---|---|---|
| 9,313,211 B1 * | 4/2016 | Lototskiy | G06F 21/554 |
| 9,811,667 B2 * | 11/2017 | Hugard, IV | H04L 63/1433 |
| 10,719,369 B1 * | 7/2020 | Aithal | H04L 63/0272 |
| 10,754,701 B1 | 8/2020 | Wagner | |
| 10,824,726 B1 * | 11/2020 | Herman Saffar | G06F 21/566 |
| 10,911,404 B1 | 2/2021 | Argenti | |
| 10,938,743 B1 | 3/2021 | Andrews | |
| 10,979,446 B1 * | 4/2021 | Stevens | H04L 63/1433 |

(Continued)

FOREIGN PATENT DOCUMENTS

| CN | 109413065 A | 3/2019 |
|---|---|---|
| CN | 111694633 A | 9/2020 |

*Primary Examiner* — Darren B Schwartz
(74) *Attorney, Agent, or Firm* — Baker Botts L.L.P.

(57) ABSTRACT

In one embodiment, a method includes generating, by a pod deployment tool, a security context profile, associating, by the pod deployment tool, the security context profile with a deployment rule, and associating, by the pod deployment tool, a vulnerability level with the deployment rule. The method also includes identifying, by the pod deployment tool, pod policies associated with a pod located within a cluster of a network and analyzing, by the pod deployment tool, conditions of the deployment rule using the pod policies. The conditions may be associated with the security context profile and the vulnerability level. The method further includes determining, by the pod deployment tool, whether to allow deployment of the pod within the network in response to analyzing the conditions of the deployment rule.

20 Claims, 7 Drawing Sheets

(56) References Cited

U.S. PATENT DOCUMENTS

| | | |
|---|---|---|
| 11,050,787 B1* | 6/2021 | Sharifi Mehr ...... G06F 9/45558 |
| 11,134,098 B1* | 9/2021 | Lieberman .......... H04L 63/1425 |
| 11,516,222 B1* | 11/2022 | Srinivasan ............ G06F 21/577 |
| 12,052,285 B1* | 7/2024 | Anjaneyapura Range .................. H04L 63/20 |
| 2005/0268336 A1 | 12/2005 | Finnegan |
| 2008/0134177 A1 | 6/2008 | Fitzgerald |
| 2010/0175108 A1 | 7/2010 | Protas |
| 2011/0145916 A1 | 6/2011 | McKenzie |
| 2011/0214176 A1 | 9/2011 | Burch |
| 2014/0053226 A1* | 2/2014 | Fadida ................ H04L 63/1408 726/1 |
| 2014/0115578 A1 | 4/2014 | Cooper |
| 2014/0317677 A1 | 10/2014 | Vaidya |
| 2015/0254451 A1 | 9/2015 | Doane |
| 2015/0312274 A1* | 10/2015 | Bishop .................... H04L 63/20 726/1 |
| 2017/0054685 A1 | 2/2017 | Malkov |
| 2017/0214767 A1 | 7/2017 | Johnsen |
| 2017/0270313 A1 | 9/2017 | Achutha |
| 2017/0279770 A1 | 9/2017 | Woolward |
| 2018/0198824 A1 | 7/2018 | Pulapaka |
| 2018/0232517 A1 | 8/2018 | Roth |
| 2018/0287902 A1 | 10/2018 | Chitalia et al. |
| 2018/0300499 A1* | 10/2018 | Agarwal ................... G06F 8/60 |
| 2018/0316725 A1 | 11/2018 | Mani |
| 2018/0324203 A1* | 11/2018 | Estes ..................... G06F 9/5061 |
| 2018/0365435 A1* | 12/2018 | Anandam ................ G06F 8/60 |
| 2019/0005246 A1 | 1/2019 | Cherny |
| 2020/0099721 A1* | 3/2020 | Golan ..................... H04L 63/20 |
| 2020/0184089 A1* | 6/2020 | Ponsini ................ G06F 21/606 |
| 2020/0218798 A1 | 7/2020 | Kosaka et al. |
| 2021/0133329 A1 | 5/2021 | Andrews |
| 2021/0168093 A1 | 6/2021 | Andrews ................. H04L 63/20 |
| 2021/0374014 A1* | 12/2021 | Appireddygari Venkataramana .. G06F 11/1451 |
| 2022/0131888 A1* | 4/2022 | Kanso ................... G06F 21/577 |
| 2023/0112579 A1* | 4/2023 | Parenti ................ H04L 41/0894 709/220 |

* cited by examiner

SYSTEMS AND METHODS FOR PROTECTING POD DEPLOYMENT

PRIORITY

This nonprovisional application is a continuation under 35 U.S.C. § 120 of U.S. patent application Ser. No. 17/335,848 filed Jun. 1, 2021 and entitled "SYSTEMS AND METHODS FOR PROTECTING POD DEPLOYMENT," which claims priority to U.S. Provisional Patent Application No. 63/145,579 filed Feb. 4, 2021, both of which are hereby incorporated by reference in their entirety.

TECHNICAL FIELD

The present disclosure relates generally to communication networks, and more specifically to systems and methods for protecting pod deployment within a cluster.

BACKGROUND

A challenge for businesses adopting DevOps practices and cloud capabilities is to maintain common and consistent environments throughout an application's lifecycle. Containers solve the application portability problem of packaging all the necessary dependencies into discrete images, which maintains consistency across cloud platforms and microservices architectures. However, the deployment of containers may allow potential attackers to gain control of a pod's node and therefore gain exposure to additional containers on the same host.

DESCRIPTION OF EXAMPLE EMBODIMENTS

Overview

Figure 1:
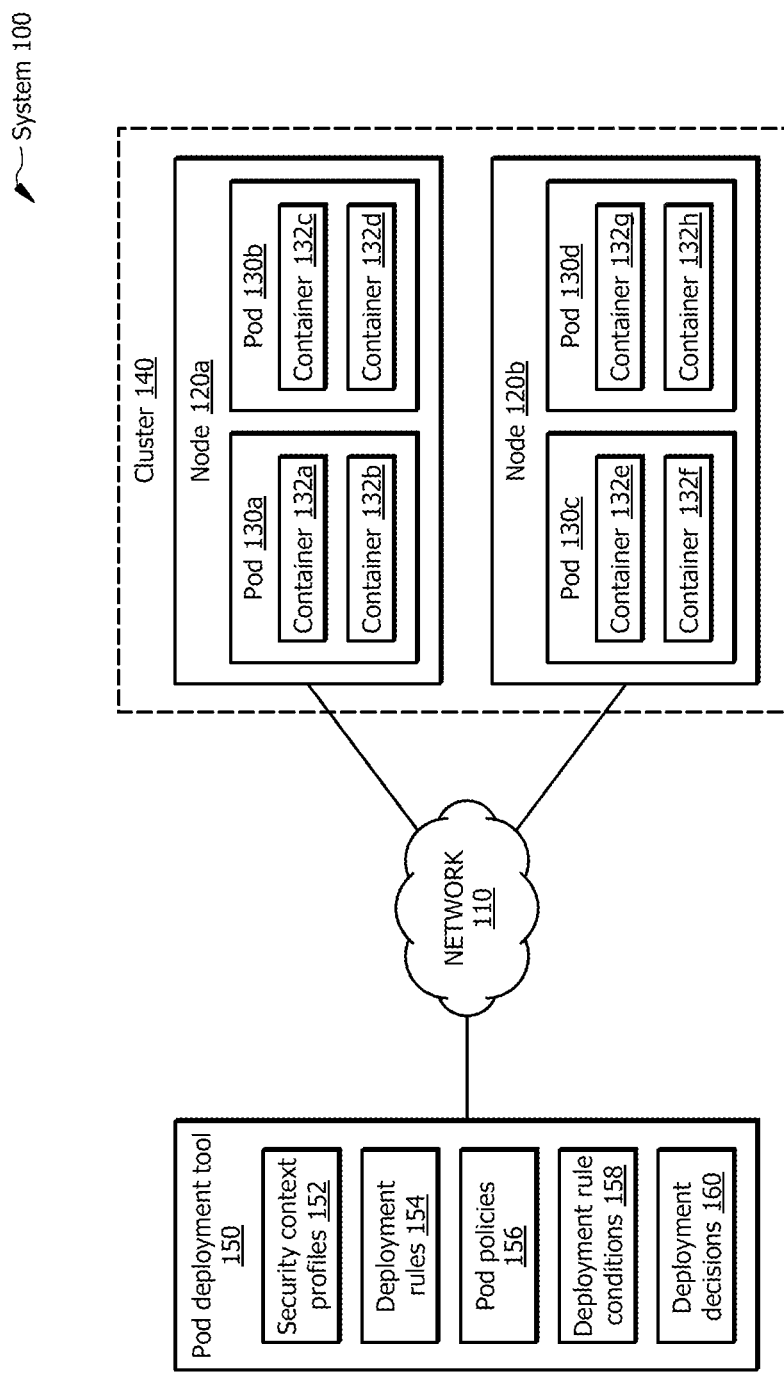
FIG. 1 illustrates an example system for protecting pod deployment within a cluster using a pod deployment tool.

According to an embodiment, a pod deployment tool includes one or more processors and one or more computer-readable non-transitory storage media coupled to the one or more processors and including instructions that, when executed by the one or more processors, cause the pod deployment tool to perform operations. The operations include generating a security context profile, associating the security context profile with a deployment rule, and associating a vulnerability level with the deployment rule. The operations also include identifying pod policies associated with a pod located within a cluster of a network and analyzing, using the pod policies, conditions of the deployment rule. The conditions may be associated with the security context profile and the vulnerability level. The operations further include determining whether to allow deployment of the pod within the network in response to analyzing the conditions of the deployment rule.

In certain embodiments, the pod policies include a first pod policy and a second pod policy. Identifying the pod policies may include monitoring the pod, receiving the first pod policy in response to monitoring the pod, and generating the second pod policy using the first pod policy. In some embodiments, the first pod policy allows privilege escalation and the second pod policy is a vulnerability level associated with the pod. The vulnerability level may be one of the following: critical, high, medium, or low. In certain embodiments, the security context profile includes one of the following: a strict security context profile, a flexible security context profile, a recommended security profile, a non-root read-only profile, and a new security profile.

In some embodiments, the operations include identifying a plurality of rules. The plurality of rules are associated with the deployment rule. In certain embodiments, the operations include generating a hierarchy for the plurality of rules. In some embodiments, the operations may include determining to allow deployment of the pod within the network when the pod policies satisfy the conditions of the deployment rule and/or determining to block deployment of the pod within the network when one or more of the pod policies fail to satisfy one or more of the conditions of the deployment rule.

According to another embodiment, a method includes generating, by a pod deployment tool, a security context profile, associating, by the pod deployment tool, the security context profile with a deployment rule, and associating, by the pod deployment tool, a vulnerability level with the deployment rule. The method also includes identifying, by the pod deployment tool, pod policies associated with a pod located within a cluster of a network and analyzing, by the pod deployment tool, conditions of the deployment rule using the pod policies. The conditions of the deployment rule may be associated with the security context profile and the vulnerability level. The method further includes determining, by the pod deployment tool, whether to allow deployment of the pod within the network in response to analyzing the conditions of the deployment rule.

According to yet another embodiment, one or more computer-readable non-transitory storage media embody instructions that, when executed by a processor, cause the processor to perform operations. The operations include generating a security context profile, associating the security context profile with a deployment rule, and associating a vulnerability level with the deployment rule. The operations also include identifying pod policies associated with a pod located within a cluster of a network and analyzing, using the pod policies, conditions of the deployment rule. The conditions of the deployment rule may be associated with the security context profile and the vulnerability level. The operations further include determining whether to allow deployment of the pod within the network in response to analyzing the conditions of the deployment rule.

Technical advantages of certain embodiments of this disclosure may include one or more of the following. The systems and methods described herein extend the capabilities of current pod security policies by providing deployment rule conditions. Certain embodiments of this disclosure provide seamless policy enforcement to users without performance degradation, which is typically associated with the deployment of agents (e.g., a DaemonSet) on each node (e.g., a host). A user can create a security context profile for its environment that validates the pod's security context to enforce environment integrity. This disclosure simplifies the creation of security context profiles by offering a strict profile and a flexible profile that differentiates the pod's execution capabilities. The user can apply a granular profile for every pod without the need to pre-define a Role or ClusterRole or the need to use Role-Based Access Control (RBAC). Instead, the user can apply a security context profile on a pod by name, label, and/or namespace.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods for protecting pod deployment. FIG. 1 illustrates an example system 100 for protecting pod deployment within a cluster 140 of a network 110 using a pod deployment tool 150. System 100 or portions thereof may be associated with an entity, which may include any entity, such as a business or company that protects pod deployment. The components of system 100 may include any suitable combination of hardware, firmware, and software. For example, the components of system 100 may use one or more elements of the computer system of FIG. 7. System 100 of FIG. 1 includes network 110, nodes 120, pods 130, containers 132, cluster 140, and pod deployment tool 150.

Network 110 of system 100 is any type of network that facilitates communication between components of system 100. Network 110 may connect one or more components of system 100. One or more portions of network 110 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), a software-defined WAN (SD-WAN), a metropolitan area network (MAN), a portion of the Internet, a portion of the Public Switched Telephone Network (PSTN), a cellular telephone network, a Digital Subscriber Line (DSL), a 3G/4G/5G network, a Long Term Evolution (LTE) network, a combination of two or more of these, or other suitable types of networks. Network 110 may include one or more different types of networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like.

Nodes 120 of system 100 are connection points within network 110 that receive, create, store and/or send data along a path. In certain embodiments, nodes 120 refer to Kubernetes nodes. Nodes 120 may include one or more redistribution points that recognize, process, and forward data to other nodes 120 of network 110. Nodes 120 may include physical and/or virtual nodes. For example, nodes 120 may include one or more virtual machines, bare metal servers, and the like. In certain embodiments, one or more nodes 120 include data communications equipment such as routers, servers, printers, workstations, switches, bridges, modems, hubs, and the like. Nodes 120 may include provider edge nodes, customer edge nodes, border nodes, etc. Nodes 120 may include one or more master nodes and/or one or more worker nodes. Master nodes 120 schedule activities, such as determining which pod 130 will run on which worker node 120, maintaining a desired state for one or more applications, scaling, rolling out new updates, or any other suitable activity. In certain embodiments, applications are deployed on worker nodes 120. In the illustrated embodiment of FIG. 1, nodes 120 include node 120a and node 120b.

Pods 130 of system 100 are deployable objects in network 110. In certain embodiments, pods 130 refer to Kubernetes pods. Each pod 130 may be a self-contained, isolated logical host that includes the systemic needs of the application it serves. Each pod 130 may run a single instance of an application within network 110. In certain embodiments, each pod 130 may be automatically assigned a unique Internet Protocol (IP) address. In some embodiments, one or more pods 130 may specify a set of shared storage volumes. In the illustrated embodiment of FIG. 1, pods 130 include pod 130a, pod 130b, pod 130c, and pod 130d. Node 120a of system 100 includes pod 130a and pod 130b. Node 120b of system 100 includes pod 130c and pod 130d.

Each pod 130 of system 100 includes one or more containers 132. Each container 132 is a standard unit of software that packages code and its dependencies, which allows an application to run quickly and reliably from one computing environment to another. Containers 132 assist in maintaining consistency across cloud platforms and microservices architectures. In the illustrated embodiment of FIG. 1, pod 130a includes container 132a and container 132b, pod 130b includes container 132c and container 132d, pod 130c includes container 132e and container 132f, and pod 130d includes container 132g and container 132h.

Cluster 140 of system 100 is a set of nodes 120 that run containerized applications. In certain embodiments, cluster 140 refers to a Kubernetes cluster. Cluster 140 may allow containers 132 to run across multiple machines and environments (e.g., virtual, physical, cloud-based, on-premises, etc.). In certain embodiments, cluster 140 is a group of master and worker nodes. For example, cluster 140 may include master node 120a and one or more worker nodes 130b. In certain embodiments, system 100 includes several clusters 140 distributed across different environments (e.g., development, testing, production, staging, finance, etc.).

In certain embodiments, containers 132 may communicate with other containers 132 within the same pod 130. For example, container 132a may communicate with container 132b of pod 130a, container 132c may communicate with container 132d of pod 130b, container 132e may communicate with container 132f of pod 130c, and/or container 132g may communicate with container 132h of pod 130d. Containers 132 in the same pod 130 may run on the same node 120 and share resources such as storage volumes and IP addressing. In certain embodiments, containers 132 may communicate with each other using the same localhost IP but different ports.

In certain embodiments, pods 130 may communicate with other pods 130 within the same cluster 140. Communication between pods 130 within the same cluster 140 may be accomplished using a dedicated pod IP address. For example, each node 120 in cluster 140 may be assigned a block of IP addresses such that every pod 130 within node 120 is allocated an IP address. Traffic between pods 130 may be routed using these IP addresses. The IP addresses of pods 130 are independent of the IP addresses of the nodes 120 and containers 132.

Pod deployment tool 150 of system 100 is a tool that determines whether to deploy one or more pods 130. Pod deployment tool 150 may include software running on one or more computer systems (e.g., computer system 700 of FIG. 7). In certain embodiments, pod deployment tool 150 includes an interface (e.g., interface 205 of FIGS. 2 through 5) that allows users to configure parameters to assist in determining whether to deploy pods 130.

In certain embodiments, pod deployment tool 150 of system 100 generates one or more security context profiles 152 for network 110. Security context profiles 152 differentiate the execution capabilities of different pods 130. For example, security context profiles 152 may differentiate a pod's communication capabilities to establish access and/or permission constraints applied to each individual pod 130 and container 132 configured at runtime. Security context profiles 152 may include one or more of the following: a strict security profile, a flexible security context profile, a recommended security profile, a non-root read-only profile, a new security profile, and the like. A strict security profile applies security "best" practices to harden the deployment configurations of pods 130 (e.g., privileges, volumes, etc.). A flexible security context profile applies minimal security "best" practices (e.g., privileges). The recommended security profile applies recommended pod security context protection. The non-root read-only profile allows the container to only run as non-root and prevents write access to the root file system. The new security profile (e.g., new security context file 410 of FIG. 5) is a security context profile that is configured by the user.

In certain embodiments, pod deployment tool 150 of system 100 generates one or more deployment rules 154 for network 110. Deployment rules 154 are regulations that govern the deployment of pods 130 within network 110. Deployment rules 154 may govern the deployment of pods 130 based on workloads (e.g., by identified pods), names (e.g., nginx), vulnerability levels (e.g., critical, high medium, or low), security context profiles 152 (e.g., strict or flexible), vulnerability levels, and the like. Deployment rules 154 may include environment rules, connection rules, cluster events rules, and the like. Environment rules govern the deployment of pods 130 based on particular environments. For example, environment rules may restrict and/or allow the deployment of pods 130 within predetermined environments. The environments may include one or more production environments, finance environments, infrastructure environments, development environments, testing environments, staging environments, and the like.

Connection rules define rules between elements (e.g., a source and a destination) of system 100. For example, connection rules may include the following rules: a rule allowing only the connection between a source and a destination (which limits access exclusively to the named source); a rule detecting the connection between the source and the destination (which allows the user/operator to closely monitor all communications between various sources to a specific destination); a rule blocking the connection between the source and the destination (which effectively may eliminate a detected vulnerability by plugging the hole that provides the defined source); a rule denying connections that are not through a service (e.g., a Kubernetes defined service) of the system; a rule blocking vulnerable pods 130 from communicating with workloads that are deployed in certain environments; a rule preventing communication of first pods 130 (e.g., billing pods) within a first environment (e.g., production environment) with second pods 130 (e.g., authentication pods) within a second environment; a rule blocking any applications with workloads that are deployed in a predetermined environment (e.g., finance environment); a rule allowing Fluentd pods to communicate with elastic pods; and the like.

In some embodiments, pod deployment tool 150 identifies one or more pod policies 156 associated with pods 130 of network 110. Pod deployment tool 150 may identify one or more pod policies 156 by monitoring pods 130 and receiving pod policies 156 in response to monitoring pods 130. Pod policies 156 allow granular security configurations at the cluster level. Default values for pod policies 156 are typically open to maximize flexibility such that the responsibility to calibrate pod policies 156 to tighten security may fall on DevOps. Pod policies 156 may be configured to control the running of privileged containers 132, the usage of host namespaces, the usage of host networking and ports, the usage of volume types, the usage of the host filesystem, permissions for specific FlexVolume drivers, the allocation of an FSGroup that owns the volumes of pod 130, the requirement for the use of a read-only root-file system, user and group IDs of container 132, restricting escalation to root privileges, Linux capabilities, SELinux context of container 132, Allowed Proc Mount types for container 132, AppArmor profile used by containers 132, seccomp profile used by containers 132, sysctl profile used by containers 132, and the like.

Pod policies 156 may be established to allow and/or restrict certain operations. For example, "privileged" pod policy 156 may be set to "true," which specifies that container 132*a* will run as privileged. As another example, "allow privilege escalation" pod policy 156 for container 132*a* may be set to "true," which allows container 132*a* to gain more privileges than its parent process such that container 132*a* can escalate privileges. As still another example, "read-only root-file system" pod policy 156 for container 132*a* may be set to "false," which mounts the root-file system for container 132*a* as read-write. As yet another example, "run as user" pod policy 156 may be set to "0," which specifies that the container will run User Identifier (UID) of 0 (root).

In certain embodiments, pod deployment tool 150 generates one or more deployment rule conditions 158 for network 110. Deployment rule conditions 158 are established to control deployment of pods 130. Examples of deployment rule conditions 158 are as follows: "run as user" (user IDs of container 132) set to "must run as non-root;" "run as group" (group IDs of container 132) set to "run as any;" "FSGgroup" (the allocation of an FSGroup that owns the volumes of pod 130) set to "run as range" (with specified range such as 1-500), "supplemental groups" set to "run as any range" (with specified range such as 1-500), "privileged" (running privileged containers 132) set to "false" (which prevents container 132 from running as privileged); "read-only root-file system" (requirement for the use of a read-only root-file system) set to "false" (which mounts the root-file system of container 132 as read-write); "allow privilege escalation" (privilege escalation to root privileges) set to "false" (which prevents container 132 from gaining more privileges that its parent process); "default allow privilege escalation" set to "false;" and "volumes" (the use of volume types) set to "configuration map," "empty directory," "projected," "downward Application Programming Interface (API)," "secret," and "persistent volume claim." "Run as any" means that any valid values for these fields can be used with the associated deployment rule condition 150.

In some embodiments, one or more deployment rule conditions 158 may be associated with security context profile 152 (e.g., a strict security profile). For example, pod 130*a* associated with pod policies 156 may be blocked from deployment within cluster 140 of network 110 if pod policies 156 do not satisfy the requirements of security context profile 152 associated with pod 130a. As another example, pod 130a associated with pod policies 156 may be allowed to deploy within cluster 140 of network 110 if pod policies 156 satisfy the requirements of security context profile 152 associated with pod 130a.

Figure 2:
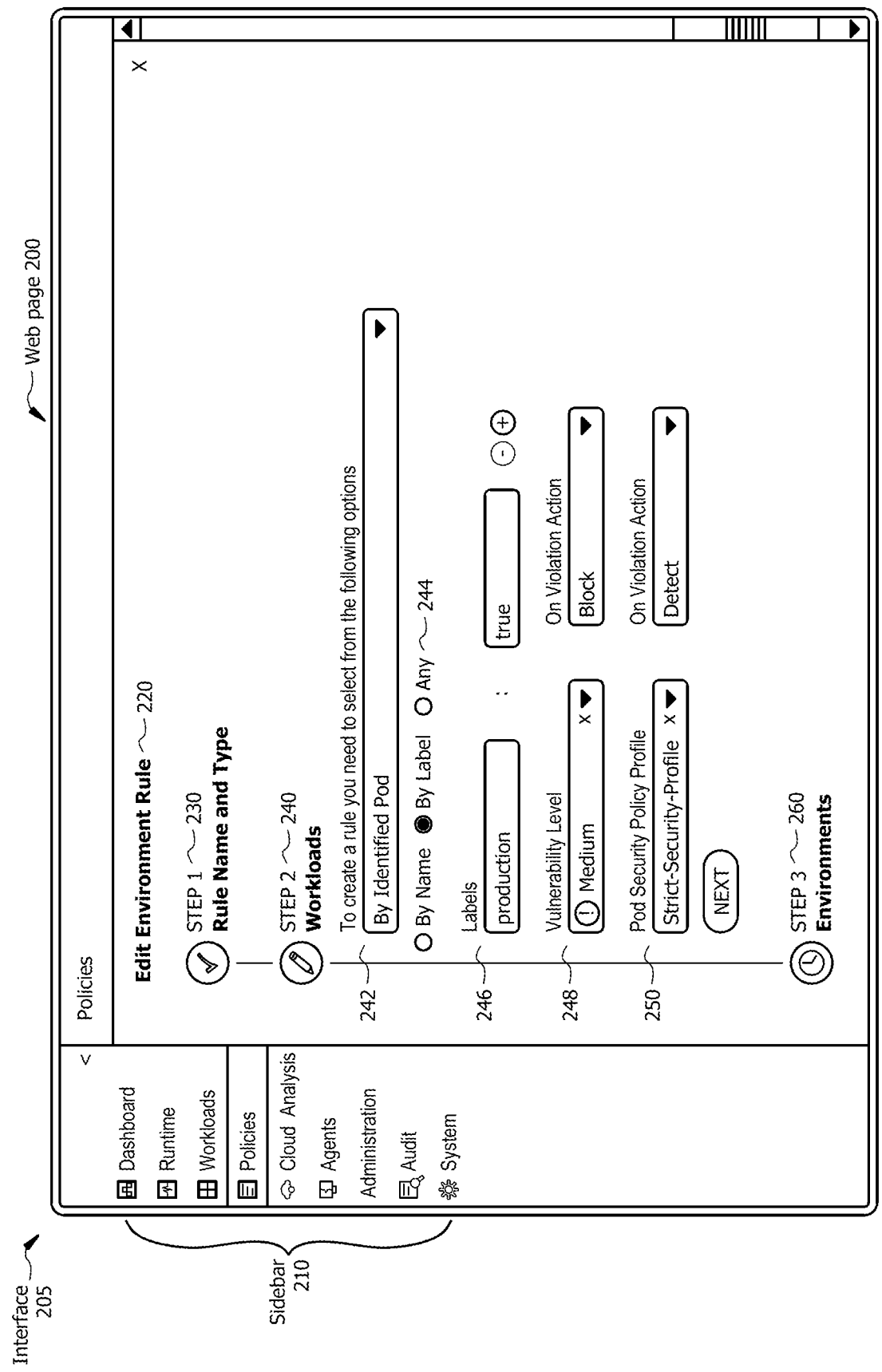
FIG. 2 illustrates an example interface for editing a rule using the pod deployment tool of FIG. 1.

In certain embodiments, pod deployment tool 150 associates one or more deployment rules 154 with one or more vulnerability levels (e.g., vulnerability level 248 of FIG. 2). Vulnerabilities are flaws or weaknesses in network 110. In certain embodiments, vulnerabilities may allow attackers to access a memory of system 100, install malware, run code, and/or modify, steal, or destroy sensitive data. Vulnerability levels may include one or more of the following: critical, high, medium, and low. A critical vulnerability level may indicate the potential for intruders to gain control of the host and/or the potential to expose highly sensitive information. A high vulnerability level may indicate the potential for intruders to gain access to specific information stored on the host such as security settings. A medium vulnerability level may indicate the potential for intruders to collect sensitive information from the host such as the precise version of software installed. A low vulnerability level may indicate the potential for intruders to collect information about the host such as information pertaining to open ports, services, etc.

In certain embodiments, pod deployment tool 150 may associate deployment rule 154 with a vulnerability level (e.g., a medium vulnerability level) such that pod policies 156 not conforming to the vulnerability level threshold (e.g., pods 130 assigned a vulnerability level of high or critical) are blocked from deployment within cluster 140 of network 110. In some embodiments, one or more vulnerability levels may be derived from one or more pod policies 156. For example, the vulnerability level of container 132a may be set to "high" if "allow privilege escalation" for container 132a is set to "true."

In certain embodiments, pod deployment tool 150 generates one or more deployment decisions 160 for network 110. In some embodiments, deployment decisions 160 may include one or more of the following: allow deployment of one or more pods 130 within one or more environments; detect one or more pods 130 running on one or more environments; block one or more pods 130 from running on one or more environments; prevent one or more pods 130 from running at a future point in time; and the like.

Pod deployment tool 150 may determine to allow deployment of one or more pods 130 within network 110 if one or more pod policies 156 satisfy deployment rule conditions 158. For example, deployment rule 154 may be associated with a "strict" security context profile 152 that requires the following deployment rule conditions 150: "privileged" set to "false;" "read-only root file system" set to "false;" and "allow privilege escalation" set to "false." Pod policies 156 associated with pod 130a may include the following: "privileged" set to "false;" "read-only root file system" set to "false;" and "allow privilege escalation" set to "false." Since pod policies 156 satisfy deployment rule conditions 158, pod deployment tool 150 may allow deployment of pod 130a within network 110.

Pod deployment tool 150 may determine to block deployment of one or more pods 130 within network 110 if one or more pod policies 156 fail to satisfy one or more deployment rule conditions 158. For example, deployment rule 154 may be associated with a "strict" security context profile 152 that requires the following deployment rule conditions 150: "privileged" set to "false;" "read-only root file system" set to "false;" and "allow privilege escalation" set to "false." Pod policies 156 associated with pod 130a may include the following: "privileged" set to "false;" "read-only root file system" set to "false;" and "allow privilege escalation" set to "true." Since pod policy 156 for "allow privilege escalation" is set to "true" and deployment rule condition 158 for "allow privilege escalation" is set to "false," pod deployment tool 150 may block deployment of pod 130a within network 110. As such, system 100 extends the capabilities of current pod policies 156 by further limiting pod deployment based on deployment rule conditions 158.

Although FIG. 1 illustrates a particular number of networks 110, nodes 120, pods 130, containers 132, cluster 140, and pod deployment tools 150, this disclosure contemplates any suitable number of networks 110, nodes 120, pods 130, containers 132, clusters 140, and pod deployment tools 150. For example, system 100 may include more than one network 110, more than one cluster 140, and/or more than one pod deployment tool 150. As another example, system 100 may include more or less than two nodes 120, four pods 130, and/or eight containers 132.

Although FIG. 1 illustrates a particular arrangement of network 110, nodes 120, pods 130, containers 132, cluster 140, and pod deployment tool 150, this disclosure contemplates any suitable arrangement of network 110, nodes 120, pods 130, containers 132, cluster 140, and pod deployment tool 150. For example, node 120a and node 120b may be a single node 120. As another example, node 120a and node 120b may be associated with different clusters 140. Furthermore, although FIG. 1 describes and illustrates particular components, devices, or systems carrying out particular actions, this disclosure contemplates any suitable combination of any suitable components, devices, or systems carrying out any suitable actions. For example, a network controller may perform one or more actions of pod deployment tool 150.

FIG. 2 illustrates an example interface 205 for editing a rule using pod deployment tool 150 of FIG. 1. Interface 205 of FIG. 2 is a user interface (UI), which allows interactions between humans and computers by providing a set of information output from a machine along with a set of control elements for the user to perform certain actions. Interface 205 may include one or more graphical user interfaces (GUIs), touchscreen GUIs, menu-driven interfaces, command line interfaces, conversational interfaces, a combination thereof, etc. Interface 205 generates web page 200 showing the content of a computer display.

As illustrated in FIG. 2, web page 200 includes a sidebar 210. Sidebar 210 is an element of user interface 205 that displays a list of links. The list of links include the following: Dashboard (displays what is running on a cluster); Runtime (displays workloads, connections, events, and namespaces), Workloads (allows user to view and edit workloads deployed to clusters), Policies (allows user to create policies for pod deployment), Cloud Analysis (allows user to manage cloud-native applications and cloud security risks), Agents (allows user to deploy an agent), Administration (allows user to organize the system), Audit (allows user to audit one or more deployments), and System (allows user to view and edit system settings). When selected, each link directs the user to a different web page. In the illustrated embodiment of FIG. 2, the Policies link is selected.

The Policies link of sidebar 210 allows a user of interface 205 to edit a rule (e.g., rule 154 of FIG. 1). In the illustrated embodiment of FIG. 2, the rule is an environment rule 220. Edit environment rule 220 allows a user to edit an existing rule that affects an environment of the network (e.g., network 110 of FIG. 1). Edit environment rule 220 carriers the user of interface 205 through a series of steps. Step 230 establishes the rule name and type. Step 240 is related to workloads and includes steps 242, 246, 248, and 250. At step 242 of workload step 240, the user may create a rule by selecting from a list of options. The list of options are included in a drop down menu. The list of options include "by identified pod," which allows the user to create the rule by identifying a particular pod (e.g., pod 130a or pod 130b of FIG. 1). Step 244 of workload step 240 allows the user to select the identified pod by name (e.g., nginx), by label (e.g., production), or by any (e.g., a namespace). In the illustrated embodiment of FIG. 1, the user has selected "by label."

At step 246 of workload step 240, the user may select one or more labels. In the illustrated embodiment of FIG. 2, "production=true" is selected. Pods that have the label "production=true" are permitted to run in the production environment unless they do not comply to the security context profile (e.g., security context profile 152 of FIG. 1). At step 248 of workload step 240, the user may select a vulnerability level and associated violation action. The vulnerability levels may include low, medium, high, critical, etc. The violation actions may include block, detect, alert, etc. In the illustrated embodiment of FIG. 2, the vulnerability level is selected as "medium" and an associated violation action is selected as "block." The "block" action blocks non-identified communications or pods without killing or pausing workloads, which ensures business continuity for critical applications. Pods with a vulnerability level of "medium" and above are restricted from running in the production environment.

Step 250 of workload step 240 allows the user to select a security context profile and an associated violation action. The security context profile may include a strict security profile, a flexible security context profile, a recommended security profile, a non-root read-only profile, a new security profile, and the like. The violation actions may include block, detect, alert, etc. In the illustrated embodiment of FIG. 2, the strict security profile is selected with the associated violation action of "detect." The "detect" action detects non-identified communications or pods without killing or pausing workloads, which ensures business continuity for critical applications. Step 260 of workload step 240 is associated with the environments (e.g., the production environment) and is discussed in more detail in FIGS. 3 through 5 below.

Although FIG. 2 describes and illustrates a particular arrangement of information for web page 200, this disclosure contemplates any suitable arrangement of information for web page 200. For example, interface 205 may display the information as a graph and/or a chart. Although this disclosure describes and illustrates particular information included in web page 200, this disclosure contemplates any suitable information to be included in web page 200. Furthermore, although this disclosure describes and illustrates particular components, devices, or systems carrying out particular actions described in FIG. 2, this disclosure contemplates any suitable combination of any suitable components, devices, or systems carrying out any suitable actions.

Figure 3:
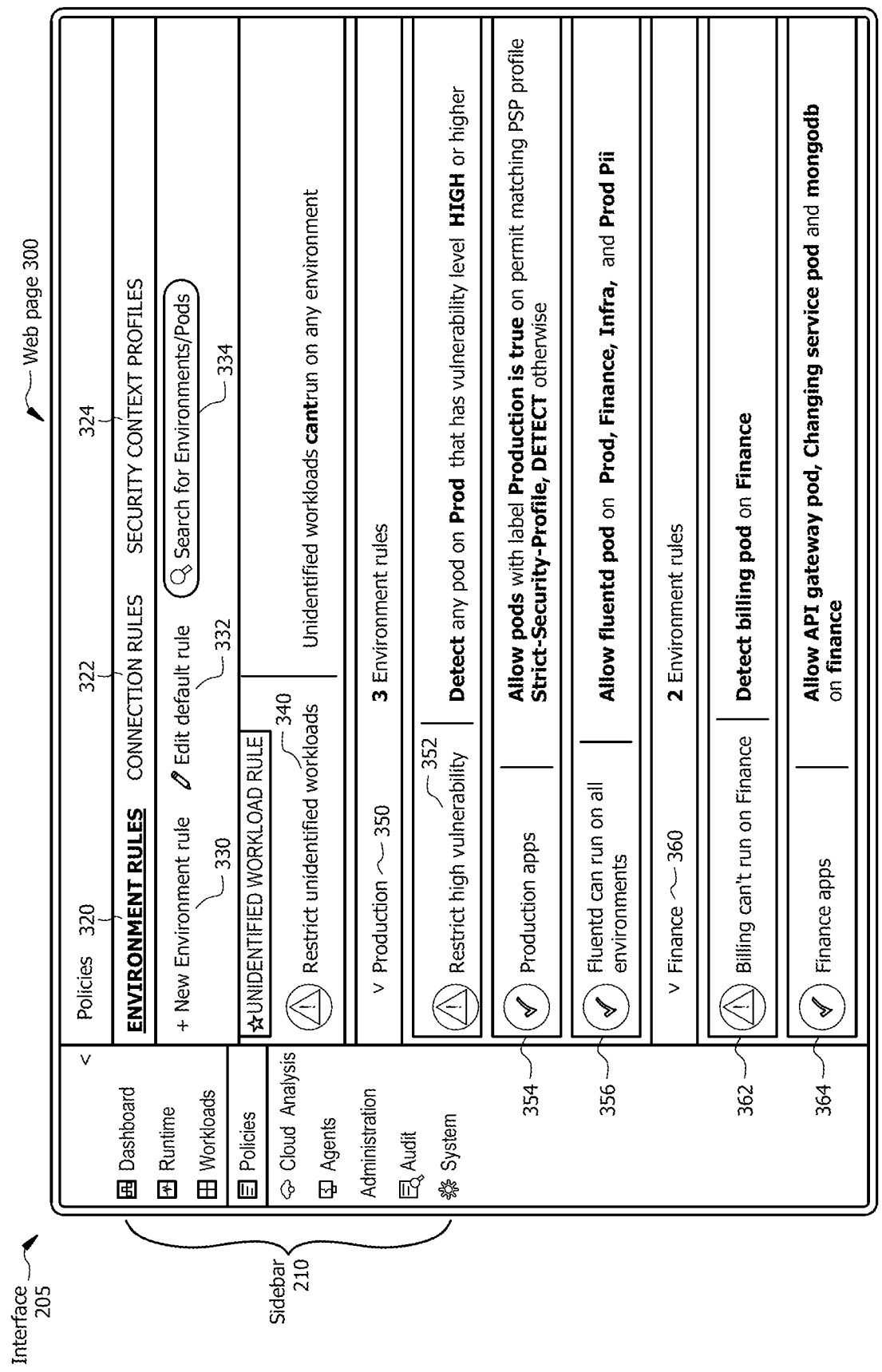
FIG. 3 illustrates an example interface for establishing rules using the pod deployment tool of FIG. 1.

FIG. 3 illustrates example interface 205 for establishing rules using pod deployment tool 150 of FIG. 1. Interface 205 generates web page 300 showing the content of a computer display. Web page 300 includes sidebar 210 of FIG. 2. In the illustrated embodiment of FIG. 3, the policies link is selected, which displays the policies page. The Policies page displayed in web page 300 includes a header. The header includes a tab for environment rules 320 (which is selected), connection rules 322 (which allows a user to define connection rules between pods running in a cluster), and security context profiles 324 (which allows a user to establish a security context profile).

When environment rules 320 is selected, the policies page also includes a sub-header displaying the following tabs: new environment rule 330 (which allows a user to create a new environment rule), edit default rule 332 (which allows a user to edit a default environment rule), and search for environments/pods 334 (which allows a user to search for environments associated with pods). Under the sub-header, web page 300 includes an unidentified workload rule 340, production environment rules 350, and finance environment rules 360. Unidentified workload rule 340 restricts unidentified workloads such that unidentified workloads cannot run on any environment. In certain embodiments unidentified workloads are workloads that are not associated with system 100 of FIG. 1.

Production environment rules 350 of web page 300 include three environment rules. The first environment rule of production environment rules 350 is restrict high vulnerability rule 352, which detects any pod within the production environment that has a vulnerability level of "high" or higher. The second environment rule of production rules 350 is production applications rule 354, which allows pods with the label "production=true" to run in the production environment unless they do not comply to the security context profile (and to detect otherwise). The third environment rule on production 350 is a Fluentd can run on all environments rule 356, which allows Fluentd pods to run in the production and other environments (e.g., finance, infrastructure, development, testing, etc.).

In certain embodiments, interface 205 allows a user to establish a hierarchy for the three production environment rules 350. In the illustrated embodiment of FIG. 3, the rules hierarchy for production environment rules 350 is in the order of: (1) restrict high vulnerability rule 352; (2) production applications rule 354; and (3) Fluentd can run on all environments rule 356. In certain embodiments, the hierarchical order in which the production environment rules are applied may affect which pods are deployed, detected, and/or blocked.

Finance environment rules 360 of screenshot 300 include two environment rules. The first environment rule of finance environment rules 360 is billing cannot run on finance rule 362, which detects billing pods within the finance environment. The second environment rule of finance environment rules 360 is finance applications rule 364, which allows API gateway pods, changing service pods, and mongodb pods to run within the finance environment. In the illustrated embodiment of FIG. 3, the rules hierarchy for finance environment rules 360 is in the order of: (1) billing cannot run on finance rule 362; and (2) finance applications rule 364. In certain embodiments, the hierarchical order in which the finance environment rules are applied may affect which pods are deployed, detected, and/or blocked.

In certain embodiments, interface 205 allows a user to establish a hierarchy for environment rules 320. In the illustrated embodiment of FIG. 3, the rules hierarchy for environment rules 320 is in the order of: (1) unidentified workload rule 340; (2) production rules 350; and (3) finance rules 360. In certain embodiments, the hierarchical order in which environment rules 320 are applied may affect which pods are deployed, detected, and/or blocked. In some embodiments, a user may establish a hierarchy for environment rules 320 as well as for one or more sub-environment rules (e.g., production environment rules 350).

Although FIG. 3 describes and illustrates a particular arrangement of information for web page 300, this disclosure contemplates any suitable arrangement of information for web page 300. For example, interface 205 may display the information as a graph and/or a chart. Although this disclosure describes and illustrates particular information included in web page 300, this disclosure contemplates any suitable information to be included in web page 300. Furthermore, although this disclosure describes and illustrates particular components, devices, or systems carrying out particular actions described in FIG. 3, this disclosure contemplates any suitable combination of any suitable components, devices, or systems carrying out any suitable actions.

Figure 4:
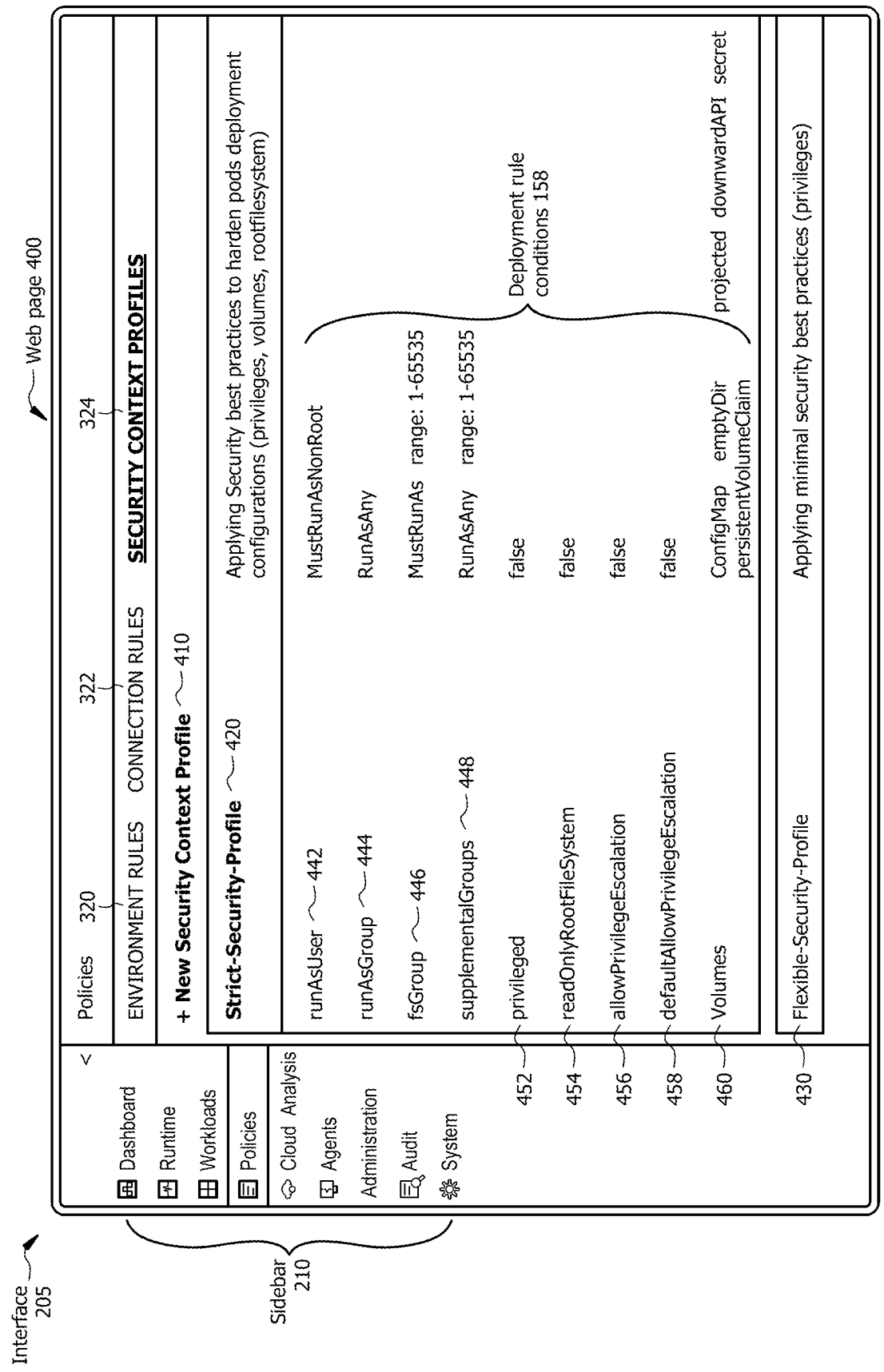
FIG. 4 illustrates an example interface for generating a strict security profile using the pod deployment tool of FIG. 1.

FIG. 4 illustrates example interface 205 for generating a strict security profile using pod deployment tool 150 of FIG. 1. Interface 205 generates web page 400 showing the content of a computer display. Web page 400 includes sidebar 210 of FIG. 2. In the illustrated embodiment of FIG. 4, the policies link is selected, which displays the policies page. The policies page displayed in web page 300 includes a header. The header includes a tab for environment rules 320, connection rules 322, and security context profiles 324 (which is selected).

When security context profiles tab 324 is selected, an option is provided to create a new security context profile 410. An option is also provided to select strict security profile 420 or flexible security context profile 430. These options allow users to deploy different profile settings (strict vs. flexible) to different containers that share the same service account. For strict security profile 420, security "best" practices" are applied to harden pod deployment configurations (e.g., privileges, volumes, root-file system, etc.).

Security context profiles tab 324 includes deployment rule conditions 158 that control deployment of pods. The following deployment rule conditions 158 are automatically assigned to strict security profile 420: run as user 442 (user IDs of the container)=must run as non-root; run as group 444 (group IDs of the container)=run as any; FSGroup 446 (the allocation of an FSGroup that owns the pod's volumes) =must run as within range 1-65535; supplemental groups 548=run as any within range 1-65535; privileged 452 (running privileged containers)=false (prevents the container from running as privileged); read-only root-file system 454 (requirement for the use of a read-only root file system) =false (mounts the container root file system as read-write); allow privilege escalation 456 (privilege escalation to root privileges)=false (prevents the container from gaining more privileges that its parent process), default allow privilege escalation 458=false; and volumes 460 (uses volume types) =configuration map, empty directory, projected, downward API, secret, and persistent volume claim. "Run as any" means that any valid values for these fields can be used with the associated deployment rule condition 158. For flexible security context profile 430, minimal security "best" practices (privileges) are applied.

As such, interface 205 of FIG. 4 allows users to create a security context profile for an environment that validates the pod's security context to enforce environment integrity. The options provided on web page 400 simplify the creation of security context profiles by offering strict security profile 420 and flexible security context profile 430, which assist in differentiating a pod's communication capabilities in accordance with the user's security preferences (e.g., applying security "best" practices or minimal security "best" practices).

Although this disclosure describes and illustrates a particular arrangement of information for web page 400 of FIG. 4, this disclosure contemplates any suitable arrangement of information for web page 400. For example, interface 205 may display information on web page 400 as a graph and/or a chart. Although this disclosure describes and illustrates particular information included in web page 400, this disclosure contemplates any suitable information to be included in web page 400. For example, interface 205 may display information associated with options for a recommended security profile and/or a non-root read-only profile. Furthermore, although this disclosure describes and illustrates particular components, devices, or systems carrying out particular actions of FIG. 4, this disclosure contemplates any suitable combination of any suitable components, devices, or systems carrying out any suitable actions.

Figure 5:
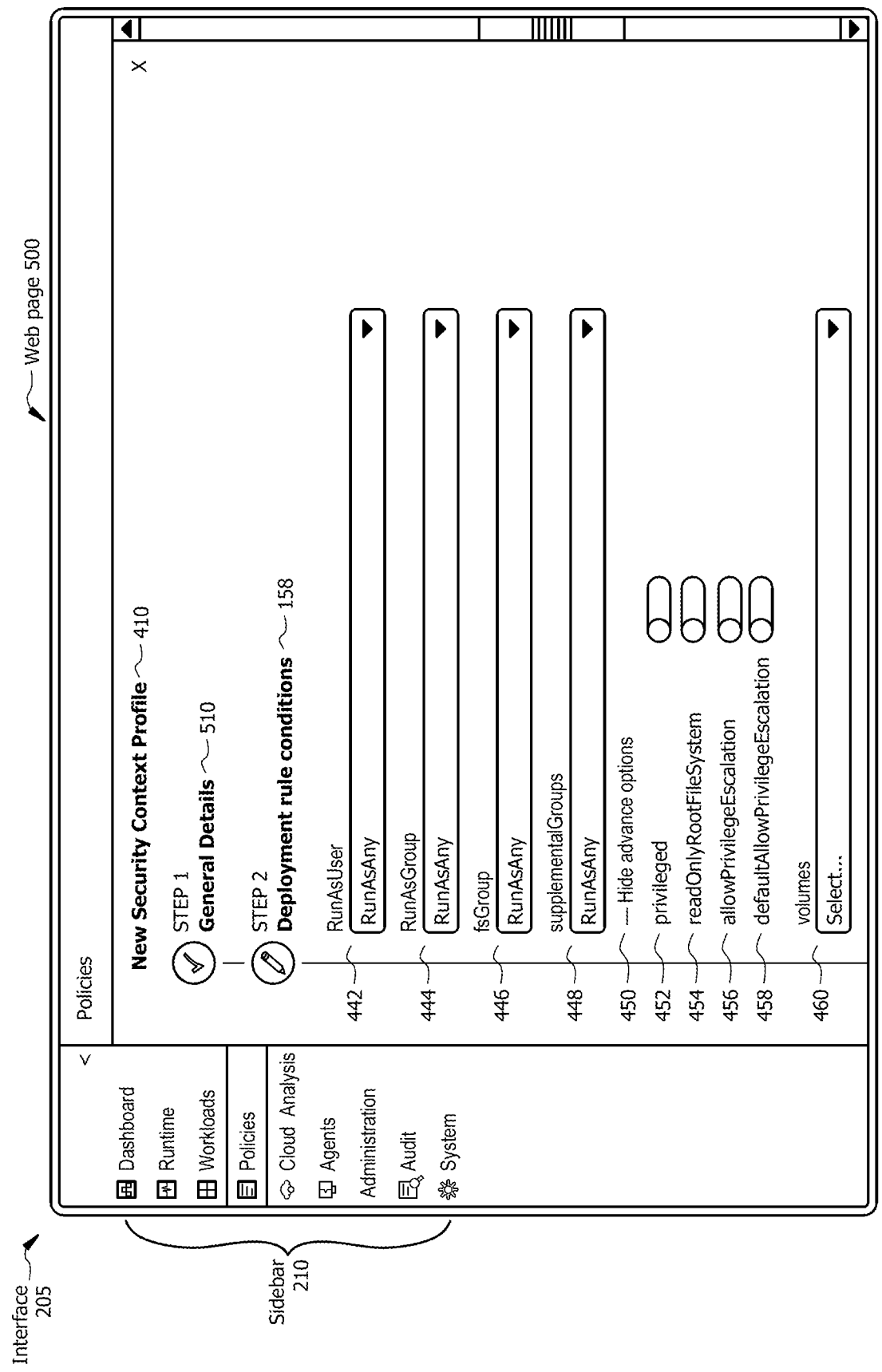
FIG. 5 illustrates an example interface for creating a new security context profile using the pod deployment tool of FIG. 1.

FIG. 5 illustrates example interface 205 for creating new security context profile 410 using pod deployment tool 150 of FIG. 1. Interface 205 generates web page 500 showing the content of a computer display. Web page 500 includes sidebar 210 of FIG. 2. In the illustrated embodiment of FIG. 5, the policies link of sidebar 210 is selected, which displays the policies page. The policies page includes steps for creating new security context profile 410.

At the first step, a user of interface 205 establishes general details 510 for creating new security context profile 410. At the second step, the user establishes deployment rule conditions 158. In the illustrated embodiment of FIG. 5, the user has established deployment rule conditions 158 as follows: run as user 442 (user IDs of the container) is set to run as any; run as group 444 is set to run as any; FSGroup 446 is set to run as any; and supplemental groups 548 is set to run as any. "Run as any" means that any valid values for these fields can be used with this deployment rule conditions 158. In some embodiments, the user may select a different option than "run as any," such as "run as privileged," "run as root," etc.

In certain embodiments, deployment rule conditions 158 may include one or more advanced options 450. A user may select (−) to hide advanced options 450 from view. Advanced options 450 may include one or more of the following: privileged 452; read-only root file system 454; allow privilege escalation 456, default allow privilege escalation 458; and volumes 460. The user is provided an option to turn each advanced option 450 on, which indicates that the condition must be met. For example, turning advanced option 450 of privileged 452 to on (true) allows a particular container to run as privileged. Deployment rule conditions 158 within new security context profile 410 allow users to set fine-grained authorizations for pod creation and update.

Although this disclosure describes and illustrates a particular arrangement of information for web page 500 of FIG. 5, this disclosure contemplates any suitable arrangement of information for web page 500. For example, interface 205 may display information on web page 500 as a graph and/or a chart. Although this disclosure describes and illustrates particular information included in web page 500, this disclosure contemplates any suitable information to be included in web page 500. Furthermore, although this disclosure describes and illustrates particular components, devices, or systems carrying out particular actions of FIG. 5, this disclosure contemplates any suitable combination of any suitable components, devices, or systems carrying out any suitable actions.

Figure 6:
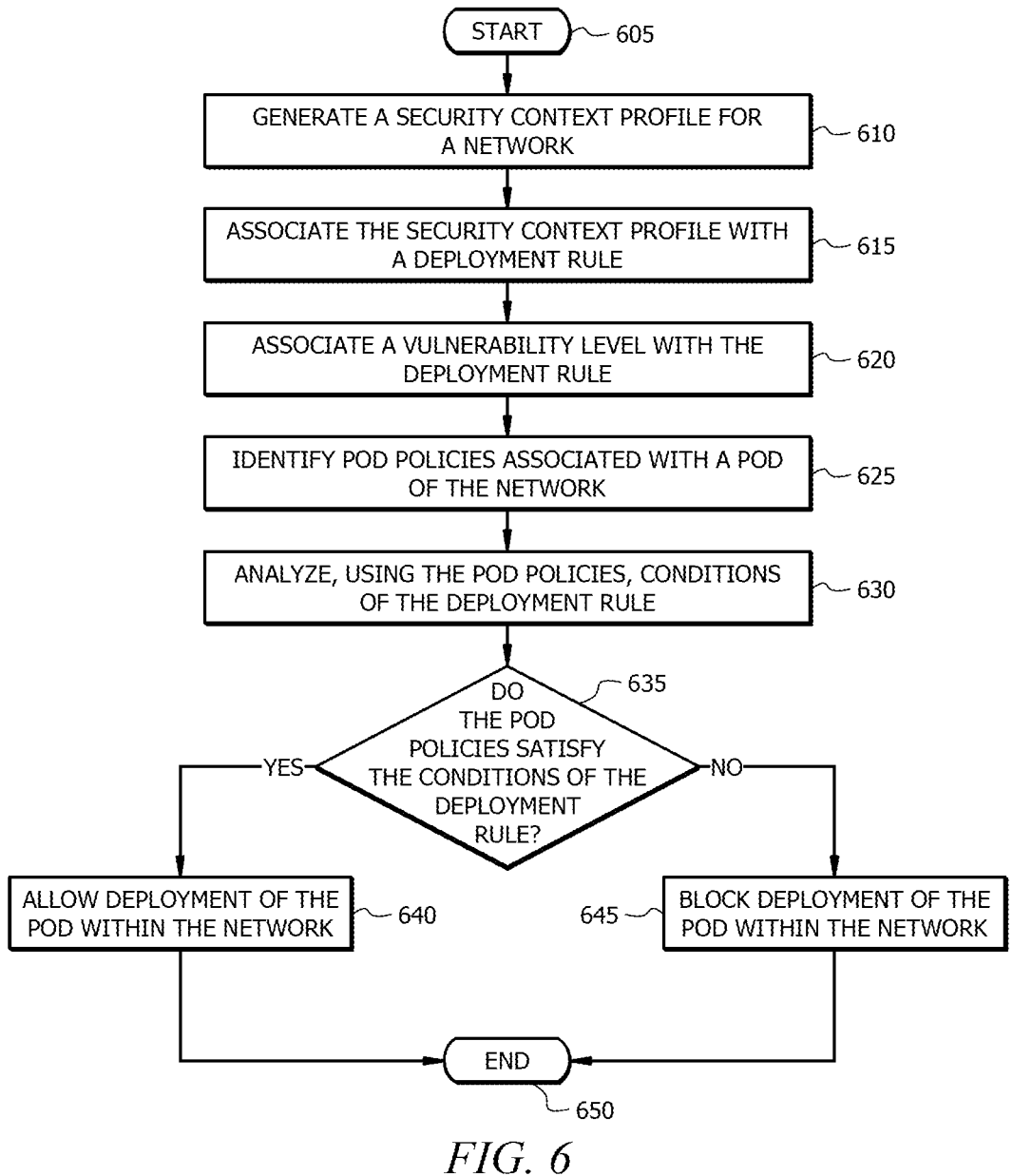
FIG. 6 illustrates an example method for protecting pod deployment.

FIG. 6 illustrates an example method 600 for protecting pod deployment. Method 600 begins at step 605. At step 610, a network component (e.g., pod deployment tool 150 of FIG. 1) generates one or more security context profiles (e.g., security context profiles 152 of FIG. 1). For example, the network component may generate a strict security profile (e.g., strict security profile 420 of FIG. 4), a flexible security context profile (e.g., flexible security context profile 430 of FIG. 4), a recommended security profile, a non-root read-only profile, a new security profile, and the like. In certain embodiments, the network component may generate the security context profile using input from a user. Method 600 then moves from step 610 to step 615.

At step 615 of method 600, the network component associates the security context profile with a deployment rule (e.g., deployment rule 154 of FIG. 1). Deployment rules may include one or more environment rules (e.g., environment rules 320 of FIG. 3), connection rules (e.g., connection rules 322 of FIG. 3), cluster events rules, and the like. For example, the network component may associate a strict security profile with an environment rule as illustrated in FIGS. 2 and 3. Method 600 then moves from step 615 to step 620.

At step 620 of method 600, the network component associates a vulnerability level (e.g., vulnerability level 248 of FIG. 2) with the deployment rule. For example, the network component may associate a "high" vulnerability level with the deployment rule such that the deployment rule restricts pods from running in particular environments (e.g., a production environment). Method 600 then moves from step 620 to step 625, where the network component identifies pod policies (e.g., pod policies 156 of FIG. 1) associated with particular pods (e.g., pods 130 of FIG. 1) of the network. Pod policies 156 may be configured to control the running of privileged containers, the usage of host namespaces, the usage of host networking and ports, the usage of volume types, the usage of the host filesystem, permissions for specific FlexVolume drivers, the allocation of an FSGroup that owns the volumes of pod, the requirement for the use of a read-only root-file system, user and group IDs of the container, restricting escalation to root privileges, Linux capabilities, and the like.

Method 600 then moves from step 625 to step 630, where the network component analyzes the conditions of the deployment rule (e.g., deployment rule conditions 158 of FIG. 1) using the pod policies. Examples of deployment rule conditions include preventing containers from running as privileged, mounting the root-file system of the container as read-write, preventing the container from gaining more privileges that its parent process, and the like. Method 600 then moves from step 630 to step 635, where the network component determines whether the pod policies satisfy the conditions of the deployment rule. For example, a pod policy that allows a container to run as privileged may satisfy a deployment rule condition that allows a container to run as privileged. As another example, a pod policy that allows a container to run as privileged may fail to satisfy a deployment rule condition that prevents a container from running as privileged.

If the network component determines that the pod policies satisfy the conditions of the deployment rule, method 600 moves from step 635 to step 640, where the network component allows deployment of the pod within the network. If, at step 635, the network component determines that the pod policies do not satisfy the conditions of the deployment rule, method 600 moves from step 635 to step 645, where the network component (e.g., an admission controller) blocks deployment of the pod within the cluster of the network. Method 600 then moves from steps 640 and 645 to step 650, where method 600 ends.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for protecting pod deployment including the particular steps of the method of FIG. 6, this disclosure contemplates any suitable method for protecting pod deployment including any suitable steps, which may include all, some, or none of the steps of the method of FIG. 6, where appropriate. For example, method 600 may include a step directed to detecting one or more pods running on one or more environments. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
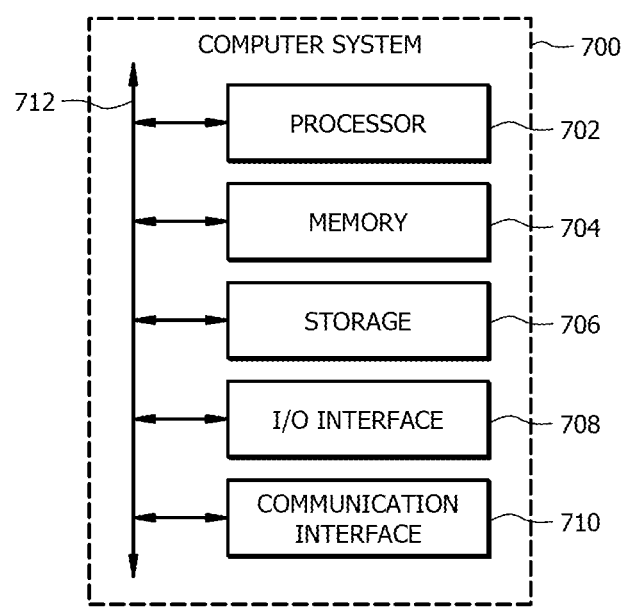
FIG. 7 illustrates an example computer system that may be used by the systems and methods described herein.

FIG. 7 illustrates an example computer system 700. In particular embodiments, one or more computer system 700 perform one or more steps of one or more methods described or illustrated herein. In particular embodiments, one or more computer system 700 provide functionality described or illustrated herein. In particular embodiments, software running on one or more computer system 700 performs one or more steps of one or more methods described or illustrated herein or provides functionality described or illustrated herein. Particular embodiments include one or more portions of one or more computer system 700. Herein, reference to a computer system may encompass a computing device, and vice versa, where appropriate. Moreover, reference to a computer system may encompass one or more computer systems, where appropriate.

This disclosure contemplates any suitable number of computer system 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer system 700; be unitary or distributed; span multiple locations; span multiple machines; span multiple data centers; or reside in a cloud, which may include one or more cloud components in one or more networks. Where appropriate, one or more computer system 700 may perform without substantial spatial or temporal limitation one or more steps of one or more methods described or illustrated herein. As an example and not by way of limitation, one or more computer system 700 may perform in real time or in batch mode one or more steps of one or more methods described or illustrated herein. One or more computer system 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer system 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus, comprising:
   one or more processors; and
   one or more computer-readable non-transitory storage media coupled to the one or more processors and comprising instructions that, when executed by the one or more processors, cause the apparatus to perform operations comprising:
   generating, prior to a deployment of a pod, a profile;
   associating the profile with a deployment rule;
   analyzing conditions of the deployment rule using a plurality of pod policies, wherein the plurality of pod policies is associated with the pod; and
   determining whether to allow the deployment of the pod in response to analyzing the conditions of the deployment rule.

2. The apparatus of claim 1, the operations further comprising:
   monitoring the pod;
   receiving, in response to monitoring the pod, a first pod policy of the plurality of pod policies; and
   generating, using the first pod policy, a second pod policy of the plurality of pod policies.

3. The apparatus of claim 2, wherein:
   the first pod policy allows privilege escalation; and
   the second pod policy is a vulnerability level associated with the pod.

4. The apparatus of claim 1, wherein the profile is one of the following profiles:
   a strict security context profile;
   a flexible security context profile,
   a recommended security profile,
   a non-root read-only profile, or
   anew security profile.

5. The apparatus of claim 1, wherein:
   the conditions of the deployment rule are associated with a vulnerability level; and
   the vulnerability level is one of the following:
   critical;
   high;
   medium; or
   low.

6. The apparatus of claim 1, the operations further comprising determining to allow the deployment of the pod when the plurality of pod policies satisfy the conditions of the deployment rule.

7. The apparatus of claim 1, the operations further comprising determining to block the deployment of the pod when one or more of the plurality of pod policies fail to satisfy one or more of the conditions of the deployment rule.

8. A method, comprising:
  generating, by a computing device and prior to a deployment of a pod, a profile;
  associating the profile with a deployment rule;
  analyzing conditions of the deployment rule using a plurality of pod policies, wherein the plurality of pod policies is associated with the pod; and
  determining whether to allow the deployment of the pod in response to analyzing the conditions of the deployment rule.

9. The method of claim 8, further comprising:
  monitoring the pod;
  receiving, in response to monitoring the pod, a first pod policy of the plurality of pod policies; and
  generating, using the first pod policy, a second pod policy of the plurality of pod policies.

10. The method of claim 9, wherein:
  the first pod policy allows privilege escalation; and
  the second pod policy is a vulnerability level associated with the pod.

11. The method of claim 8, wherein the profile is one of the following profiles:
  a strict security context profile;
  a flexible security context profile,
  a recommended security profile,
  a non-root read-only profile, or
  anew security profile.

12. The method of claim 8, wherein:
  the conditions of the deployment rule are associated with a vulnerability level; and
  the vulnerability level is one of the following:
    critical;
    high;
    medium; or
    low.

13. The method of claim 8, further comprising determining to allow the deployment of the pod when the plurality of pod policies satisfy the conditions of the deployment rule.

14. The method of claim 8, further comprising determining to block the deployment of the pod when one or more of the plurality of pod policies fail to satisfy one or more of the conditions of the deployment rule.

15. One or more computer-readable non-transitory storage media embodying instructions that, when executed by a processor, cause the processor to perform operations comprising:
  generating, prior to a deployment of a pod, a profile;
  associating the profile with a deployment rule;
  analyzing conditions of the deployment rule using a plurality of pod policies, wherein the plurality of pod policies is associated with the pod; and
  determining whether to allow the deployment of the pod in response to analyzing the conditions of the deployment rule.

16. The one or more computer-readable non-transitory storage media of claim 15, the operations further comprising:
  monitoring the pod;
  receiving, in response to monitoring the pod, a first pod policy of the plurality of pod policies; and
  generating, using the first pod policy, a second pod policy of the plurality of pod policies.

17. The one or more computer-readable non-transitory storage media of claim 16, wherein:
  the first pod policy allows privilege escalation; and
  the second pod policy is a vulnerability level associated with the pod.

18. The one or more computer-readable non-transitory storage media of claim 15, wherein the profile is one of the following profiles:
  a strict security context profile;
  a flexible security context profile,
  a recommended security profile,
  a non-root read-only profile, or
  anew security profile.

19. The one or more computer-readable non-transitory storage media of claim 15, wherein:
  the conditions of the deployment rule are associated with a vulnerability level; and
  the vulnerability level is one of the following:
    critical;
    high;
    medium; or
    low.

20. The one or more computer-readable non-transitory storage media of claim 15, the operations further comprising determining to allow the deployment of the pod when the plurality of pod policies satisfy the conditions of the deployment rule.

* * * * *